United States Patent
Emmerich et al.

(12)

(10) Patent No.: US 8,683,012 B2
(45) Date of Patent: Mar. 25, 2014

(54) REMOTE CONTROL MULTIPLEXING SYSTEM AND METHOD

(75) Inventors: Mark Emmerich, San Jose, CA (US); Kent Parker, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1796 days.

(21) Appl. No.: 11/789,416

(22) Filed: Apr. 24, 2007

(65) Prior Publication Data

US 2008/0267178 A1    Oct. 30, 2008

(51) Int. Cl.
*H04L 12/12*    (2006.01)
*H04L 29/08*    (2006.01)
*H04L 12/24*    (2006.01)
*G06F 9/44*    (2006.01)

(52) U.S. Cl.
CPC ........... *H04L 29/08099* (2013.01); *H04L 12/24* (2013.01); *H04L 41/00* (2013.01); *G06F 9/4445* (2013.01)
USPC ............................................ 709/219; 726/15

(58) Field of Classification Search
CPC ........................................................ H04L 12/24
USPC ............................................................. 715/745
See application file for complete search history.

(56) References Cited

U.S. PATENT DOCUMENTS

2005/0060655 A1 *    3/2005    Gray et al. .................... 715/745

OTHER PUBLICATIONS

John Bazik, XMX—An X Protocol Multiplexor, Oct. 7, 1999 and 2005, Brown University, pp. 1-7.*
Judith Grobe Sachs, Secure X Windows with SSH, Aug. 10, 2001, pp. 1-4.*
Yusuke Shinyama, VNC2SWF, Oct. 29, 2005, pp. 1-4.*

* cited by examiner

*Primary Examiner* — Andrew Goldberg

(57) ABSTRACT

There is provided a device and method for providing remote control of a computer system. An exemplary remote control multiplexing system comprises a first viewing application that is adapted to allow a controlling computer to control a remote computer via a communication link and a connection multiplexer that is adapted to establish a first communication session with the first viewing application and a second communication session with a second viewing application and to deliver packets received from the remote computer via the communication link to the first viewing application and the second viewing application independently as though each of the first viewing application and the second viewing application is an only viewing application in communication with the connection multiplexer.

25 Claims, 3 Drawing Sheets

REMOTE CONTROL MULTIPLEXING SYSTEM AND METHOD

BACKGROUND

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

In the field of computer networking, remote control technology allows one computer to control another. To enable remote control, the two computers are typically connected by some kind of high-speed network, with a screen sharing application running on each one. In most remote control solutions, the two computers are connected via the same local area network (LAN), which is a high-speed connection that supports direct communication between any attached computers.

Providing remote control over the internet usually involves some sort of port-forwarding scheme, such as is provided by secure shell (SSH) servers. The SSH server is used to establish a virtual private network (VPN) between the controlling computer and the controlled computer. Once this VPN is set up between the two computers (via the SSH server), no other computers can join the connection to collaborate or otherwise participate in the session.

In a customer support situation, a team of collaborating support technicians is usually connected via a LAN. Each technician services an individual support request from a customer. A remote control session between the technician's computer and the customer's computer allows the technician to resolve the customer's problem much more efficiently than by describing the repair steps over the telephone or via a chat message. When the technician encounters a difficult problem and requires assistance from a peer, the ability to collaborate via the network improves the productivity of both support technicians or engineers and generally increases customer satisfaction. One shortcoming of a VPN solution for remote control is that only one computer can participate in the remote control session. Moreover, the network bandwidth over the internet limits the ability to share the connection with others.

While a collaborating technician could start a remote control session with the fellow technician, the extra work of the additional remote control session taxes the first technician's computer. Alternatively, a new VPN connection could be set up and used to connect to the remote computer, but the extra network traffic would burden the end-user's internet connection.

An additional concern is that a customer's sensitive data is exposed to the technician during a help session in which the technician has access to a customer's computer. To provide verification that the technician did not access, modify, or remove any of the sensitive data, it is desirable to record the session actions and screen shots of the session in case a customer later claims that sensitive data was compromised.

An alternative to VPN connection sharing is the use of software tools that allow multiple users to join in a live meeting. Hewlett-Packard's (HP's) Virtual Classroom and Microsoft's NetMeeting are examples of such tools. In those systems, one person in the meeting runs a presentation, typically by sharing the desktop of a computer with other participants. Unlike NetMeeting, which requires a LAN connection, Virtual Classroom allows participants to join via the internet. In NetMeeting, only one participant at any time can control the shared application, and control can be passed between any of the participants. In HP Virtual Classroom, only participants who enter the tool as presenters can share content, but control can be passed between them. Neither NetMeeting nor Virtual Classroom provides for recording of the network packets. Instead, they both rely on external tools to record the entire screen as a movie.

HP Virtual Classroom is hosted on a set of servers maintained by HP information technology (IT) resources. All session information is maintained on those servers and is communicated over the internet. As more participants connect, they connect to the Virtual Classroom servers directly. There is no point-to-point remote control. In NetMeeting, all traffic passes through the computer that hosts the meeting. If the hosting computer is connected (via a general VPN service) over a broadband network, the performance for all participants is impacted. Also, every new session connects directly to the host computer, even though NetMeeting provides no built-in support for connecting over the internet without installing a VPN client.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Exemplary embodiments of the present invention employ a server on the internet for forwarding the networking ports from a remote computer (such as a customer computer) over the internet. Once received by a computer that is part of a LAN (such as a technician's computer during a help session), the network packet may be easily shared over the LAN with other collaborators. In this way, multiple collaboration sessions can be set up with different customers without taxing a single hosting server (except for the port—forwarding traffic). Each originating technician's desktop serves as the session-management "server" for the collaboration session.

An exemplary embodiment of the present invention comprises a remote control connection multiplexing adapter that extends the capabilities of a point-to-point remote control system. The solution can be used to add collaboration, session recording, and other features to an otherwise private, point-to-point remote control session. These features can be added at the receiving side of a low-bandwidth connection to a remote host without compromising the data throughput of the sending computer.

As set forth in detail below, a remote control solution in accordance with an exemplary embodiment of the present invention comprises a port-multiplexer that establishes a link between a remote control application and an SSH client (for VPN), making it possible to repeat each network packet received from the customer to any additional remote control applications, in addition to the principal remote control application. A remote control recording application may be associated with the port multiplexer to record every incoming screen image network packet sent by a remote control server running on a user's computer.

Figure 1:
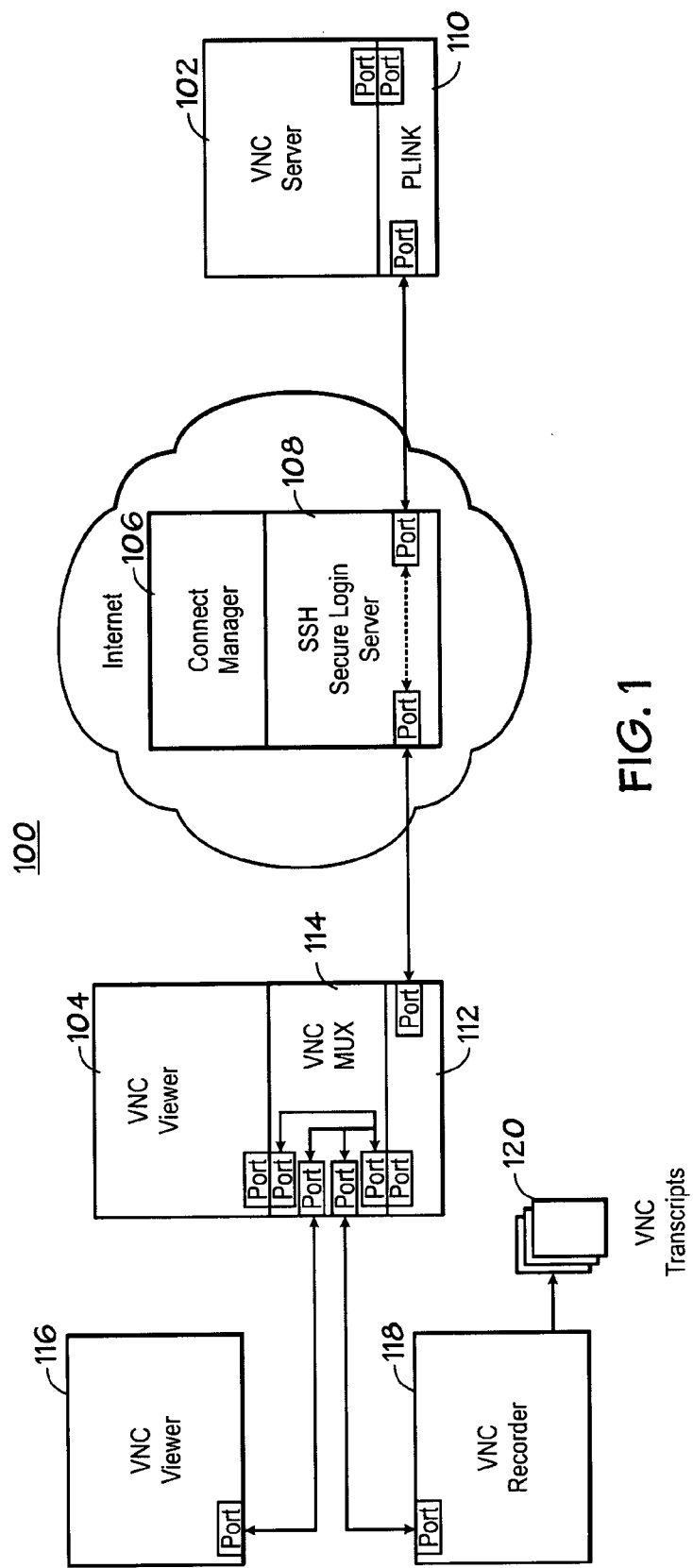
FIG. 1 is a block diagram of a remote control system according to an exemplary embodiment of the present invention.

FIG. 1 is a block diagram of a remote control system according to an exemplary embodiment of the present invention. The remote control system is generally referred to by the reference number 100. The remote control system 100 comprises a Virtual Network Computing (VNC) server 102. The VNC server 102 is an open source application adapted to perform screen sharing in conjunction with an open source viewing application such as a VNC viewer 104 via a secure connection. Moreover, the VNC server 102 may be installed on a remote customer computer to allow access to and control of the remote customer computer by a technician on a controlling computer during a help session.

A connection manager 106 is adapted to set up the secure connection using an SSH secure login server 108. The secure connection provides for communication between an open source Putty Link (PLINK) client component 110 connected to the VNC server 102 and a PLINK client component 112 connected to the VNC viewer 104 via the SSH secure login server 108. The PLINK client components 110 and 112 are readily available open source port forwarding clients. As will be appreciated by those of ordinary skill in the art, the PLINK client component 110 and the PLINK client component 112 are respectively adapted to communicate with the VNC server 102 and a VNC multiplexer 114 connected to the VNC viewer 104 via typical communication ports. Similarly, the PLINK client component 110 and the PLINK client component 112 are adapted to communicate with the SSH secure login server 108 via typical communication ports.

In an exemplary embodiment of the present invention, the VNC multiplexer 114 is adapted to intercept communications between the VNC viewer 104 and the associated PLINK client component 112. All requests are passed between the two originating applications (e.g., the VNC server 102 and the VNC viewer 104). Additionally, session-setup requests are cached for subsequent connections. Both the VNC viewer 104 and the PLINK client component 112 are unaware of the presence and actions of the VNC multiplexer 114. In an exemplary embodiment of the present invention, the VNC multiplexer 114 comprises a distinct executable program or module that is launched by a coordinating application that will also launch an SSH client (to establish a secure network) and the VNC server 102. The setup of remote sessions and flow of information within the VNC multiplexer 114 is discussed in greater detail below with reference to FIG. 2.

By intercepting the network port connection between the PLINK client component 112 and the VNC viewer 104, the VNC multiplexer 114 is adapted to allow a remote screen to be shared efficiently with multiple other VNC applications, including other viewers and even a session recording application. The VNC multiplexer effectively listens to a collection of networking ports and incoming connection requests. For example, when a help session is initiated with a customer, a first VNC viewer (e.g., the VNC viewer 104) attaches to a port of the VNC multiplexer 114. Thereafter, all network traffic to or from the VNC viewer 104 is directed through the VNC multiplexer 114 to the PLINK client component 112.

An exemplary VNC multiplexer 114 comprises a plurality of ports to facilitate connection of additional VNC applications, such as a second VNC viewer 116 and/or a VNC recorder 118. As additional VNC applications connect to the VNC multiplexer 114, their session setup requests are intercepted (and satisfied) by the VNC multiplexer 114. All network traffic is duplicated to new VNC applications as they attach. In this manner, each additional VNC application that connects to the VNC multiplexer 114 is treated independently as though it is the only remote control application attached to the VNC multiplexer 114. In this way, other VNC applications can connect to the VNC multiplexer 114 and observe the same screen sharing session as the originator. All outgoing user-input messages are forwarded to each of the attached VNC applications and all incoming messages (including screen images) are sent to every attached VNC application. In an exemplary embodiment of the present invention, all VNC application sessions are stopped by the VNC multiplexer 114 when the first remote control application (e.g., the VNC viewer 104) terminates the connection. This helps to ensure that the session is completely terminated (for end-user security purposes).

As will be appreciated by those of ordinary skill in the art, the exemplary VNC viewer 116 may be used to begin a collaboration session between a first technician using the VNC viewer 104 and a second technician using the VNC viewer 116 while the VNC viewer 104 is participating in a help session with a remote computer via the VNC server 102. In this manner, the second technician is easily able to participate in the help session without burdening the computers of either the first technician or the customer.

The VNC recorder 118 may be adapted to store all session information as one of a plurality of VNC transcripts 120. If needed, the VNC transcripts 120 may be used to verify that a technician did not access inappropriate areas of a customer's computer during a help session. In an exemplary embodiment of the present invention, packets are time-stamped as they are stored in one of the plurality of VNC transcripts 120. Time-stamping the packets allows the speed of a session playback to be throttled. Throttling the playback speed allows a standard remote control viewer to connect to the VNC recorder 118 to see the session played back.

By facilitating session recording at a packet level rather than by recording entire screen shots of data, VNC recorder 118 provides greater efficiency in recording remote control sessions. Also, packet level session recording is superior to screen-capture recording because screen-capture recording could potentially miss the details of a particular screen image packet, depending upon the timing of the screen recording. Missing the appearance of a pop-up menu and subsequent selection during playback could mean the loss of potentially valuable session activity. In addition, screen capture might also miss session activity that is off-screen if the screen size at the VNC server is larger than the screen size at the VNC viewer.

In an exemplary embodiment of the present invention, the VNC recorder 118 is a component installed on the same LAN as the VNC viewer 104 (or on the same computer system). In such a system, the VNC recorder 118 is adapted to capture and record the screen image data from a remote control session with a remote computer running the VNC server 102. The VNC recorder 118 uses the same VNC protocol to set up a recording session that the VNC viewer 104 uses to set up a remote control viewing session. As each screen image request is received, it is stored locally in a cache. Screen images consist of complete screen images followed by a sequence of partial updates to the original screen. These pieces are stored in the cache in the order in which they are received along with a timestamp. Additionally, the session setup requests are stored in the cache to facilitate playback of the session.

In a separate operating thread, each screen image data packet is extracted from the cache, along with its timestamp, and stored into a persistent store such as one of the plurality of VNC transcripts 120. The persistent store can be configured using a locally stored file, a file on a network share, a database table or the like. Because of the size of the data transmitted during a lengthy remote control session (e.g., five minutes or more), storing the packets in a database table may become impractical. Storing the data in a file on a network share and recording the file in the database could potentially require fewer database resources.

In an alternative embodiment of the present invention, the VNC recorder is connected directly to a port of the PLINK client component 112 instead of to the VNC multiplexer 114. In this configuration, the VNC recorder 118 can capture and record the screen of a computer on the internet, provided that the computer has an installed VNC server application and a PLINK client component. This configuration can allow an electronic presentation to be recorded by another computer over the internet. The presentation can then be replayed at a later time using a modified version of the VNC viewer 104.

An exemplary embodiment of the VNC viewer 104 may be adapted to play back recorded messages for a standard VNC viewer. The VNC recorder 118 can be adapted to be opened in playback mode by specifying an archive (such as an input file or a database connection) and table entry (ID). In playback mode, the VNC recorder 118 creates a network port and waits for a VNC-type application (e.g., a VNC viewer) to connect. To, playback a session, the session setup requests are sent to the VNC viewer. Then, each session request is read from the archive and sent (via the network port) to the VNC viewer in the order that it was received. Additionally, the VNC recorder 118 can be deployed for monitoring users over the internet, without having an active remote control session. This functionality may be useful for facilitating training, supervision, auditing, and possibly user-testing.

Based on the foregoing description, those of ordinary skill in the art will appreciate that a remote control system 100 in accordance with an exemplary embodiment of the present invention comprises a system that allows for the creation of a point-to-point remote control session over the internet, with the ability to collaborate from within a networked environment such as a support center. Multiple, simultaneous sessions can be started and the load is distributed across the LAN, rather than being centralized on extra server equipment.

Figure 2:
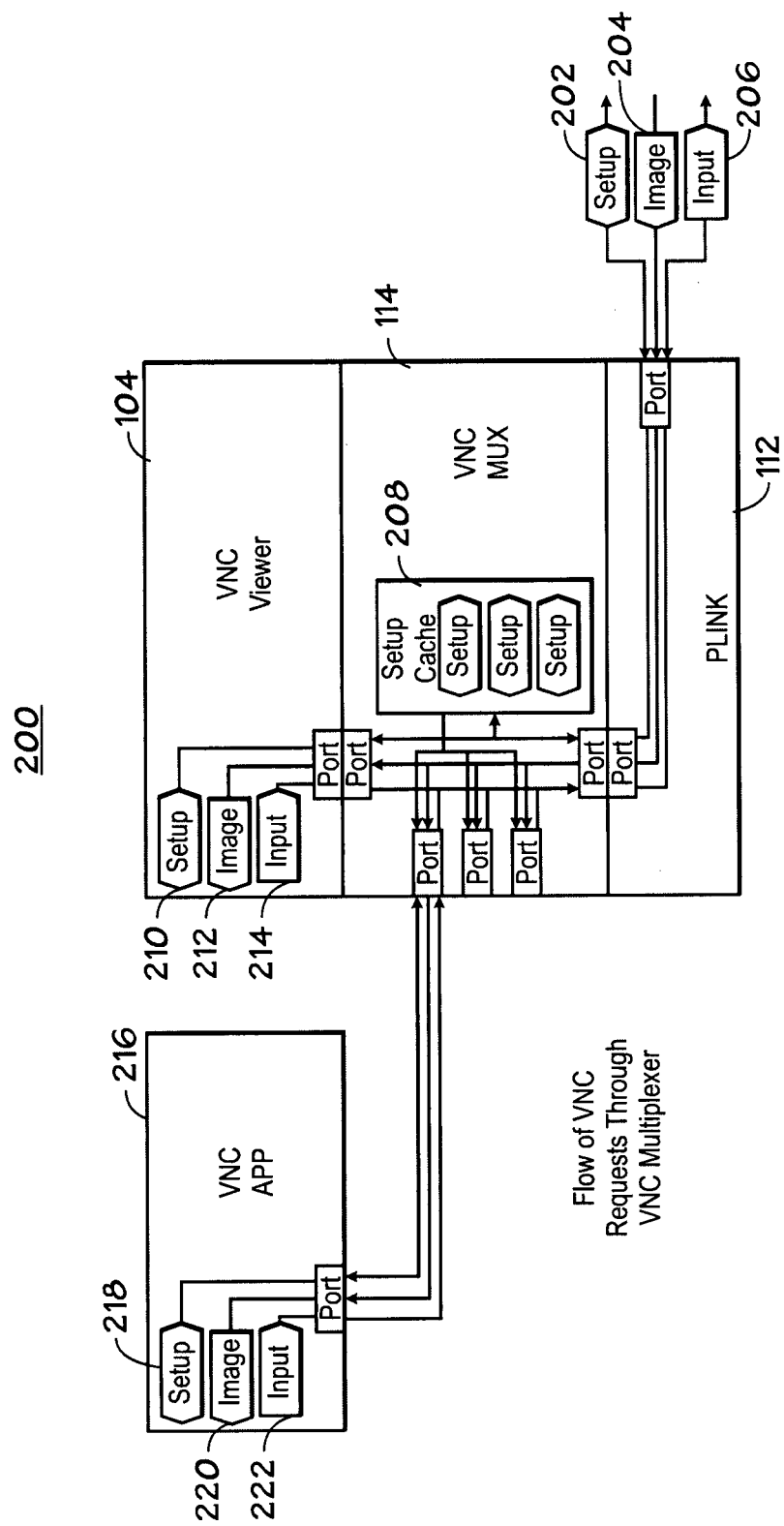
FIG. 2 is a block diagram of a remote control multiplexing adapter according to an exemplary embodiment of the present invention.

FIG. 2 is a block diagram of a remote control multiplexing adapter according to an exemplary embodiment of the present invention. The remote control multiplexing adapter is generally referred to by the reference number 200. FIG. 2 illustrates the flow of data between the PLINK client component 112, the VNC multiplexer 114, the VNC viewer 104 and a second (or subsequent) VNC application 216 (such as the VNC viewer 116 (FIG. 1) or the VNC recorder 118 (FIG. 1)).

As set forth above, the VNC multiplexer 114 comprises a networking software component that is installed between the PLINK client component 112 and the VNC viewer 104 to share the network packets of a remote control session with other VNC-type applications. In an exemplary embodiment of the invention, the VNC multiplexer 114 is loaded after the PLINK client component 112 has established a secure (VPN) connection to the SSH secure login server 108. The VNC multiplexer 114 then connects to the SSH secure login server 108 via a designated remote control port and sets up additional networking ports for incoming connections. Each port is used by a VNC-type application, such as the VNC viewer 116 (FIG. 1) or the VNC recorder 118 (FIG. 1).

When the first VNC-type application (e.g., the VNC viewer 104) connects to the VNC multiplexer 114, network packets are forwarded by the VNC multiplexer 114 to a port of the PLINK client component 112 (which sends the packets to the SSH secure login server 108 (FIG. 1)). A small number of packets are sent by the VNC viewer 104 and the VNC server 102 (FIG. 1) to establish the operating parameters for the connection. Each of these VNC session setup requests (and its response message) from the first session is recorded in memory, such as a setup cache 208. Once the session is active, request recording stops (for the setup requests) and the requests are maintained for future connections.

As subsequent VNC-type applications connect to the VNC multiplexer 114, those VNC-type applications will issue the same session setup requests to the destination. The VNC multiplexer 114 intercepts these setup-requests and responds with the setup information recorded when the first session connected. Once the session setup requests have been processed, all incoming data from the VNC server 102 (FIG. 1) via the PLINK client component 112 is echoed to the new VNC-type application. Any user-input requests from the VNC-type application will be forwarded to the PLINK session, giving the appearance that they originated from the first instance of the VNC viewer 104. Those of ordinary skill in the art will appreciate that the VNC recorder 118 (FIG. 1) will not typically send user-input requests because it is adapted to receive and record data. Also, requests for the latest screen image will be forwarded to the SSH secure login server 108 (FIG. 1) to be fulfilled by the VNC server 102 (FIG. 1). The resulting screen data is directed to one or more VNC-type applications. Any screen images whose requests originate from the VNC server 102 (FIG. 1) (and not the VNC client) will be forwarded (multiplexed) to all of the sessions.

In the exemplary embodiment shown in FIG. 2, data flow between the VNC multiplexer 114 and the associated components takes place over three separate channels: a setup channel, an image channel and an input channel. For example, a setup channel 202 is adapted to transmit setup data between the PLINK client component 112 and the SSH secure login server 108 (FIG. 1). An image channel 204 is adapted to transmit image data between the PLINK client component 112 and the SSH secure login server 108 (FIG. 1). An input channel 206 is adapted to transmit input data between the PLINK client component 112 and the SSH secure login server 108 (FIG. 1). With respect to the transmission of data between the VNC viewer 104 and the VNC multiplexer 114, a setup channel 210 is adapted to transmit setup data between the VNC viewer 104 and the VNC multiplexer 114. An image channel 212 is adapted to transmit image data between the VNC viewer 104 and the VNC multiplexer 114. An input channel 214 is adapted to transmit input data between the VNC viewer 104 and the VNC multiplexer 114. Finally, with respect to the transmission of data between the VNC application 216 and the VNC multiplexer 114, a setup channel 218 is adapted to transmit setup data between the VNC application 216 and the VNC multiplexer 114. An image channel 220 is adapted to transmit image data between the VNC application 216 and the VNC multiplexer 114. An input channel 222 is adapted to transmit input data between the VNC application 216 and the VNC multiplexer 114.

Figure 3:
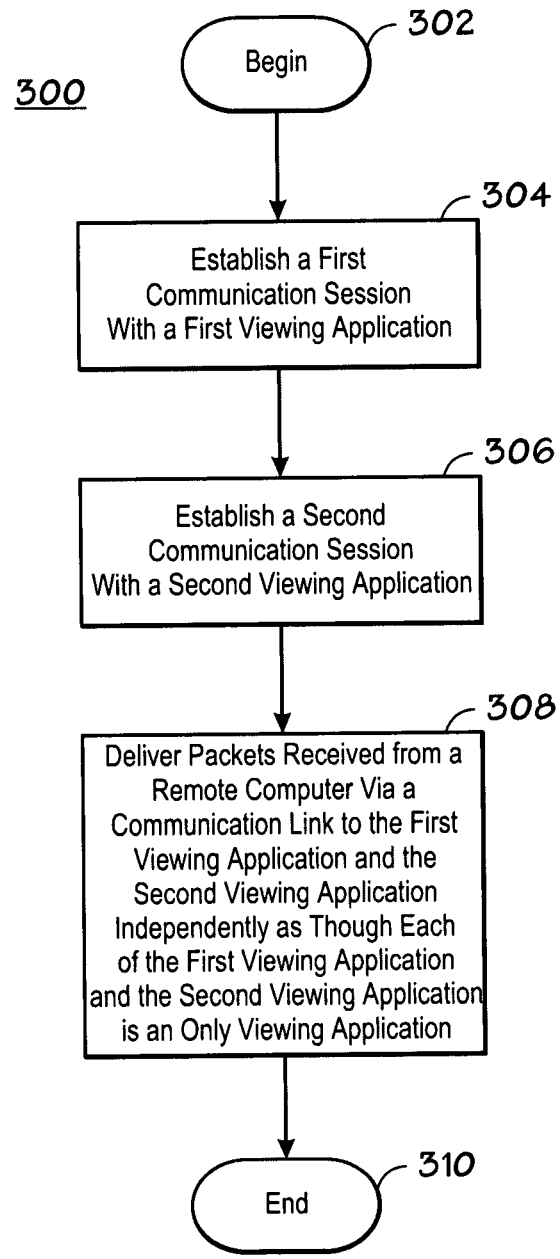
FIG. 3 is a flow chart showing a method of providing remote control access to a computer according to an exemplary embodiment of the present invention.

FIG. 3 is a flow chart showing a method of providing remote control access to a computer according to an exemplary embodiment of the present invention. The method is generally referred to by the reference number 300. At block 302, the method begins. A first communication session is established with a first viewing application, as shown at block 304. At block 306, a second communication session is established with a second viewing application. At block 308, packets received from a remote computer via a communication link are delivered to the first viewing application and the second viewing application independently as though each of the first viewing application and the second viewing application is an only viewing application. The method ends at block 310.

As mentioned above, one or more of the particular embodiments disclosed herein may be used in combination with other exemplary embodiments herein disclosed. The exemplary embodiments provide a reasonable level of security and deterrent effect without incurring cost. Specifically, the exemplary embodiments are able to be implemented on a standard motherboard and chassis. Additionally, by not using a standard boot procedure, the methods prevents use of standard tools, such as DOS tools, and is therefore resistant to being hacked by use of those tools.

What is claimed is:

1. A remote control multiplexing system, comprising:
   a first viewing application that is adapted to allow a controlling computer to control a remote computer via a communication link; and
   a connection multiplexer that is adapted to establish a first communication session with the first viewing application and a second communication session with a second viewing application and to deliver packets received from the remote computer via the communication link to the first viewing application and the second viewing application independently as though each of the first viewing application and the second viewing application is an only viewing application in communication with the connection multiplexer, wherein data is exchanged over the communication link via a setup channel, an image channel and an input channel.

2. The remote control multiplexing system recited in claim 1, wherein the communication link comprises a secure communication link.

3. The remote control multiplexing system recited in claim 1, wherein the communication link comprises a secure communication link established by a secure shell (SSH) server.

4. The remote control multiplexing system recited in claim 1, wherein the communication link is established between a Putty Link (PLINK) client component connected to the first viewing application and a PLINK client component connected to a remote control server on the remote computer.

5. The remote control multiplexing system recited in claim 1, wherein the first viewing application comprises a virtual network computing (VNC) viewer.

6. The remote control multiplexing system recited in claim 1, comprising a session recorder that is adapted to receive packets corresponding to screen images from the remote computer via the connection multiplexer.

7. The remote control multiplexing system recited in claim 6, wherein the packets corresponding to screen images are stored in a transcript.

8. The remote control multiplexing system recited in claim 1, wherein the first viewing application is adapted to communicate with a remote control server executing on the remote computer.

9. A remote control multiplexing system, comprising:
   a first viewing application that is adapted to allow a controlling computer to control a remote computer via a communication link; and
   a connection multiplexer that is adapted to establish a first communication session with the first viewing application and a second communication session with a second viewing application and to deliver packets to the communication link as though both the packets from the first viewing application and the packets from the second viewing application were generated by the first viewing application, wherein data is exchanged over the communication link via a setup channel, an image channel and an input channel.

10. The remote control multiplexing system recited in claim 9, wherein the communication link comprises a secure communication link.

11. The remote control multiplexing system recited in claim 9, wherein the communication link comprises a secure communication link established by a secure shell (SSH) server.

12. The remote control multiplexing system recited in claim 9, wherein the communication link is established between a Putty Link (PLINK) client component connected to the first viewing application and a PLINK client component connected to a remote control server on the remote computer.

13. The remote control multiplexing system recited in claim 9, wherein the first viewing application comprises a virtual network computing (VNC) viewer.

14. The remote control multiplexing system recited in claim 9, comprising a session recorder that is adapted to receive packets corresponding to screen images from the remote computer via the connection multiplexer.

15. The remote control multiplexing system recited in claim 14, wherein the session recorder is adapted to store the packets corresponding to screen images in a transcript.

16. The remote control multiplexing system recited in claim 9, wherein the first viewing application is adapted to communicate with a remote control server executing on the remote computer.

17. A method, comprising:
   establishing a first communication session with a first viewing application;
   establishing a second communication session with a second viewing application;
   delivering packets received from a remote computer via a communication link to the first viewing application and the second viewing application independently as though each of the first viewing application and the second viewing application is an only viewing application; and
   controlling the remote computer via the first viewing application or the second viewing application; and
   exchanging data over the communication link via a setup channel, an image channel and an input channel.

18. The method recited in claim 17, comprising controlling the remote computer via the communication link.

19. The method recited in claim 17, wherein the communication link comprises a secure communication link.

20. The method recited in claim 17, wherein the communication link comprises a secure communication link established by a secure shell (SSH) server.

21. The method recited in claim 17, wherein the communication link is established between a Putty Link (PLINK) client component connected to the first viewing application and a PLINK client component connected to a remote control server on the remote computer.

22. The method recited in claim 17, wherein the first viewing application comprises a Virtual Network Computing (VNC) viewer.

23. The method recited in claim 17, comprising recording packets corresponding to screen images received from the remote computer via the communication link.

24. The method recited in claim 23, comprising storing the packets corresponding to screen images in a transcript.

25. The method recited in claim 17, comprising communicating with a remote control server executing on the remote computer.

* * * * *